United States Patent [19]

Atwood

[11] 4,166,287
[45] Aug. 28, 1979

[54] PHOTOFLASH LAMP ARRAY

[75] Inventor: Harry Atwood, Chagrin Falls, Ohio

[73] Assignee: General Electric Company, Schenectady, N.Y.

[21] Appl. No.: 843,785

[22] Filed: Oct. 20, 1977

[51] Int. Cl.² ............................................. G03B 15/02
[52] U.S. Cl. ..................................... 362/13; 362/237; 362/346
[58] Field of Search .................. 362/10, 13, 227, 237, 362/346

[56] References Cited
U.S. PATENT DOCUMENTS 4,064,431 12/1977 Cote ................................... 362/13 X Primary Examiner—Stephen J. Lechert, Jr.
Attorney, Agent, or Firm—Norman C. Fulmer; Lawrence R. Kempton; Frank L. Neuhauser

[57] ABSTRACT

A photoflash lamp array of the FlipFlash type having connector tabs each having three terminals for connection to three contacts of a camera socket, two of the socket contacts being electrically connected together. The two terminals of the array intended for connection to the two socket contacts which are electrically connected together, are electrically connected together in the flash array.

6 Claims, 5 Drawing Figures

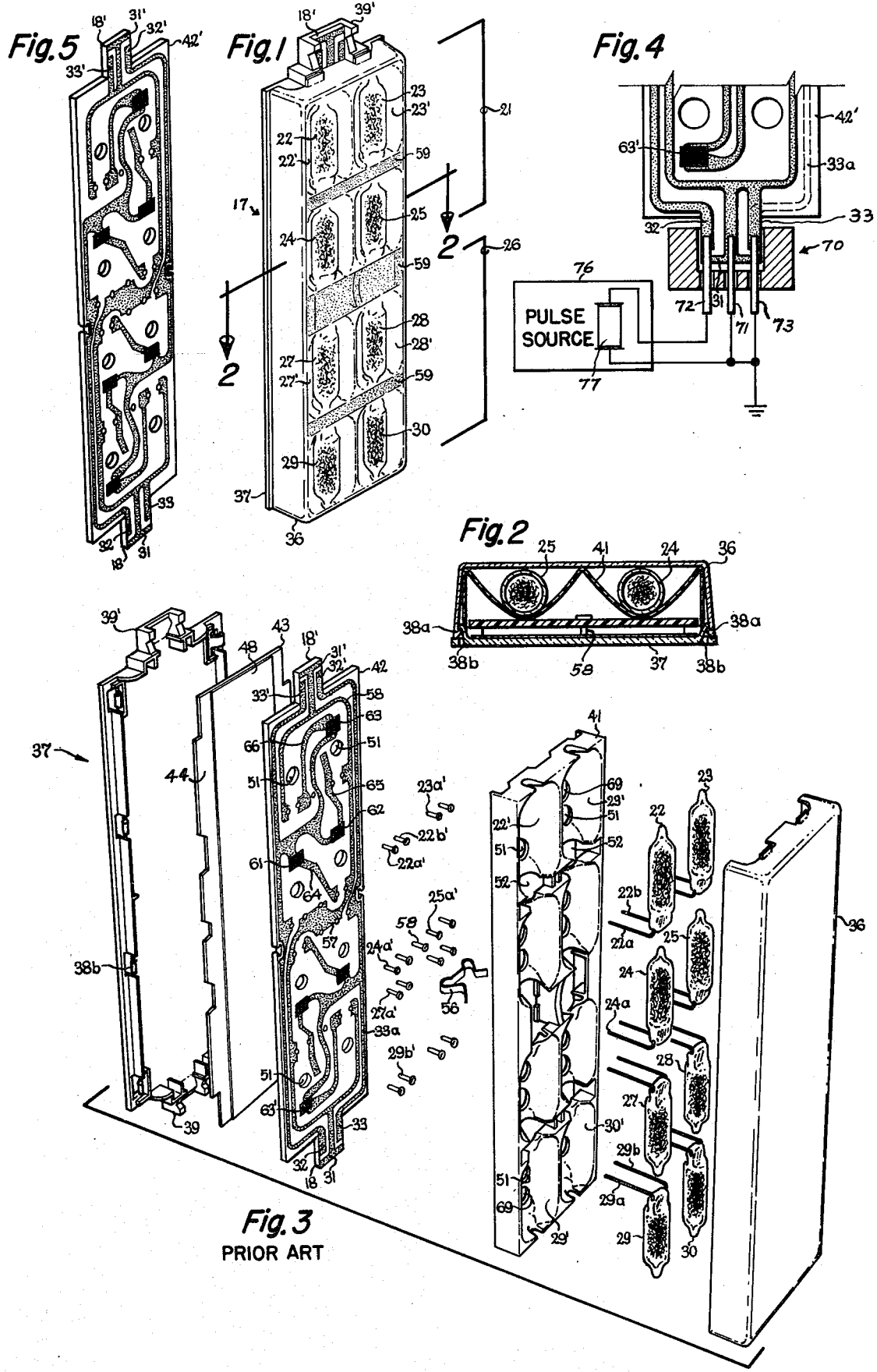

PHOTOFLASH LAMP ARRAY

BACKGROUND OF THE INVENTION

The invention is in the field of multiple photoflash lamp units, such as planar arrays of the FlipFlash type.

U.S. Pat. No. 3,937,946 to Weber discloses a Flip-Flash type of flash array having a group of four lamps in the upper half of the array and another group of four lamps in the lower half of the array. A connector tab at the bottom of the array has first and second connection terminals connected to the upper group of lamps and their sequential firing circuitry, and another connector tab at the top of the array has first and second connection terminals connected to the lower group of lamps and their sequential firing circuitry. The flash array is used by plugging one of its connector tabs into a camera socket having first and second contacts which contact respectively with the connector tabs' terminals and which are connected to a firing pulse source, and the "upper" group of lamps, which are farther from the camera's lens axis than the "lower" group of lamps, are flashed, one at a time, for taking four flash pictures. The array is then turned around and the other connector tab is plugged into the socket, for four more flash pictures. By thus flashing only lamps that are spaced away from the lens axis, the undesirable "red-eye" effect is reduced, which can occur if the flashing lamp is near the lens axis so that its light illuminates a part of a subject's retina that is seen in the picture.

The flash lamps in the FlipFlash array are high voltage types, requiring about 1,000 volts (at low energy) for flashing. The firing pulse, of a few thousand volts, can be produced by a small piezoelectric element in the camera and which is impacted in synchronism with the opening of the shutter. The flash lamps can become accidentally flashed by electrostatic electricity when the array is handled by a person who is electrostatically charged with a few thousand volts, unless the array is properly designed. A technique for reducing the possibility of electrostatic flashing of the lamps and disclosed in U.S. Pat. Nos. 3,980,875 and 3,980,876 to Cote, is to provide shielding in the array around, or partly around, the lamps and circuitry, the connector terminals being arranged so that the first one of them is more readily touched than the second when the array is handled by a person, this first terminal being connected electrically to the shield in the array. Thus, any electrostatic charge applied to the terminal areas of the array will be carried, via the more readily touched first terminal, to the shielding and be dissipated into surrounding space and thus is prevented from causing lamps to flash. The first (more readily touched) terminal and the circuitry to which it is connected are conveniently referred to as "electrical ground" of the array, the second terminal being the "electrically hot" terminal.

U.S. Pat. No. 3,952,320 to Blount discloses a FlipFlash type of array having means for preventing accidental flashing of lamps in the lower part of the array when lamps are flashed in the upper part of the array. Such accidental flashing could occur due to stray capacitance coupling of the firing pulse to the circuitry for the lower group of lamps, from the conductor carrying the firing pulse from the plugged-in lower "hot" terminal to the sequencing circuitry for the upper group of lamps. To prevent this accidental flashing, a third connector terminal is provided on each connector tab and is electrically connected in the array to the "hot" terminal of the other connector tab. The camera socket is provided with a third contact for contacting the third terminal of the plugged-in array tab, this third socket contact being connected electrically to the electrical ground first socket contact. Thus, when the array is connected to the camera socket, the third terminal becomes connected to the "ground" terminal, thus short-circuiting enough of the circuitry of the lower group of lamps to prevent the aforesaid accidental flashing.

Some camera manufacturers have found it expedient to make the two electrical ground contacts of the socket from a single piece of metal, and as a result these two contacts might not be sufficiently resilient with respect to each other to reliably individually contact against the respective first and third terminals of the plugged-in connector tab. As a result, there have been instances wherein the electrical ground first terminal of the array was not contacted, resulting in a firing pulse being applied only across the two "hot" terminals of the array and causing two lamps to flash simultaneously; the desired one in the upper group and an undesired one in the lower group.

SUMMARY OF THE INVENTION

Objects of the invention are to provide an improved flash array, and to provide a double-ended flash array which solves the aforesaid problem of simultaneous flashing of two lamps when the socket contacts do not properly contact all terminals of the array.

The invention comprises, briefly and in a preferred embodiment, a flash lamp array of the FlipFlash type having a first group of lamps and associated sequencing circuitry in the upper half of the array connected electrically to first and second terminals of a first connector tab at the bottom of the array. A second group of lamps and associated circuitry is in the lower half of the array and is connected electrically to first and second terminals of a second connector tab at the top of the array. The first terminals of the connector tabs are connected electrically together and to "electrical ground" in the array. The array's connector tabs are adapted to be connected alternately to a camera socket having first and second contacts for respectively contacting the first and second terminals of a connector tab, for applying lamp-firing pulses thereto. The socket is provided with a third contact connected electrically to the first contact, as described above. In accordance with the present invention, each of the array's connector tabs is provided with a third terminal adapted to contact the third socket contact when the array is connected to the socket, and these third terminals are electrically connected in the array to the first terminals and hence to electrical ground. The third terminals are positioned on the array's connector tabs the same way as disclosed in the above-identified Blount patent, but are connected differently electrically and function to prevent improper lamp flashing in the array if the camera sockets' second and third contacts fail to both make good contact against the flash array's first and third terminals, as described above. In so doing, advantages achieved by the aforesaid Blount patent are lost.

BRIEF DESCRIPTION OF THE DRAWING

FIG. 1 is a perspective view of a multiple flash lamp array of the FlipFlash type.

FIG. 2 is a sectional view taken on the line 2—2 of FIG. 1.

FIG. 3 is a perspective exploded view of a FlipFlash type of array, showing a prior art circuit board and connector tabs.

FIG. 4 shows a flash array connector tab, in accordance with the invention, connected to a camera socket.

FIG. 5 is a perspective view of a circuit board and connector tabs in accordance with the invention.

DESCRIPTION OF THE PREFERRED EMBODIMENT

A multiple flash lamp unit 17 of the planar array type and containing a plurality of electrically fired flash lamps is provided with a plug-in connector tab 18 at the lower end thereof, adapted to fit into a socket of a camera or flash adapter. The lamp array 17 is provided with a second plug-in connector tab 18' at the top end thereof, whereby the array 17 is adapted to be attached to the camera socket in either of two orientations, i.e., with either the tab 18 or the tab 18' plugged into the socket. The array 17 is provided with an upper group 21 of flash lamps 22, 23, 24, and 25, and a lower group 26 of flash lamps 27, 28, 29, and 30, the lamps being arranged in a planar configuration. Reflectors 22', etc., are disposed behind the respective flash lamps, so that as each lamp is flashed its light is projected forwardly of the array 17. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the lens axis are flashable, thus reducing the undesirable red-eye effect, as is more fully described in the above-referenced patents.

The construction of the array comprises front and back housing members 36 and 37, which preferably are made of plastic and are provided with interlocking members 38 which can be molded integrally with the housing members and which lock the housing members together in final assembly to form a unitary flash array structure. FIG. 2 shows a pair of interlocking members 38a carried at the rear of the side of the front housing member 36 interlocked with a pair of interlocking members 38b of the back housing member 37. In the preferred embodiment shown, the front housing member 36 is a rectangular concavity and the back housing member 37 is substantially flat and includes integral extensions 39 and 39' at the ends thereof which partly surround and protect the connector tabs 18 and 18' and also function to facilitate mechanical attachment to the camera socket. Sandwiched between the front and back housing members 36 and 37, in the order named, are the flash lamps 22, etc., a unitary reflector member 41 (preferably of aluminum-coated plastic) shaped to provide the individual reflectors 22', etc., a printed circuit board 42 provided with integral connector tabs 18 and 18', and an indicia sheet 43 which may be provided with instructions, information, and other indicia such as flash indicators located behind the respective lamps and which change color due to heat and/or light radiation from a flashing lamp, thus indicating at a glance which of the lamps have been flashed and not flashed.

The indicia sheet 43 may be of paper or thin cardboard preferably having a metal coating 44 over its front surface and provided with openings where the flash indicators are desired, and these openings are covered with flash indicator material, such as a sheet-like heat-sensitive plastic material, for example biaxially oriented polypropylene, which shrinks or melts when subjected to heat or radiant energy from an adjacent flashing lamp thus effectively changing the color of the openings in the indicia sheet 43. For example, the plastic material can be colored green on its back side by ink or other suitable means, and the green disappears and the opening becomes a different color (dark, for example) when the plastic shrinks or melts away due to heat from an adjacent flashing lamp. The front of the plastic (toward the lamps) should be coated with dark ink so as to absorb heat more readily. One or more flash indicator sheets 48 may be arranged over all of the flash indicator openings. Openings 51 are provided through the reflector unit 41 and the circuit board 42 to facilitate radiation from flashing lamps reaching the flash indicators. The rear housing member 37 is transparent (either of clear material or provided with window openings) to permit viewing of the indicia on the indicia sheet 43. The front housing member 36 is transparent at least in front of the lamps 22, etc., to permit light from flashing lamps to emerge frontwardly of the array, and may be tinted to alter the color of light from the flash lamps.

The height and width of the rectangular array are substantially greater than its thickness, and the heights and widths of the reflector member 41 and the circuit board 42 are substantially the same as the interior height and width of the housing member 36, to facilitate holding the parts in place.

The tab 18, which is integral with the circuit board 42, is provided with a pair of electrical terminals 31 and 32, and similarly the tab 18' is provided with a pair of terminals 31' and 32', for contacting contact terminals of a camera socket for applying firing voltage pulses to the array. Each tab is provided with a third terminal 33 and 33', respectively, which will be described subsequently. The terminals 31 and 31' are shown as having a lateral "T-bar" configuration for temporarily shorting the socket terminals while the array is being plugged in, to discharge any residual voltage charge in the firing pulse source and also to reduce the likelihood of lamps being accidentally flashed by electrostatic voltage when the array is handled, as is disclosed in the last above-referenced Cote patent.

The circuit board 42 has a "printed circuit" thereon, as will be described, for causing sequential flashing of the lamps by firing voltage pulses applied to the terminals 31, 32 or 31', 32'. The top and bottom halves of the printed circuitry preferably are reverse mirror images of each other. The lead wires 22a, 22b, etc., of the lamps 22, etc., may be attached to the circuit board 42 in various ways, such as by means of metal eyelets 22a', 22b', etc., placed through openings in the board. The lead wires 22a, 22b, etc., pass through openings 52 in the reflector member 41 and into or through the respective pairs of eyelets 22a', 22b', etc., and the ends of the eyelets are crimped or bent to hold the lead wires and make electrical contact thereto and also to hold the eyelets in place with their heads in electrical contact with the circuit of the circuit board.

A clip 56 is clipped onto the reflector member 41, which reflector preferably is made of metal-coated plastic, and the rear of the clip 56 rests in touching contact against an area 57 of an electrical ground circuit run 58 on the board and which includes the terminals 31 and 31' and which makes contact with one of the connector eyelets 22a', or 22b', etc., for each of the lamps 22, etc., whereby the reflector unit 41 additionally functions as an electrically grounded shield, as is disclosed in the above-referenced Cote patents and in U.S. Pat. No. 3,935,442 to Hanson. The metal coating 44 on the indicia sheet 43 also functions as a shield by being connected to the circuit ground area 57 via an eyelet 58 as disclosed in U.S. Pat. No. 4,019,043 to Blount.

Areas 59 on the transparent front housing member 36 may be made opaque or partly opaque, such as by making the surface roughened at these areas, to fully or partly conceal the lamp lead-in wires 22a, 22b, etc., and/or the lower portions of the lamps, for improved appearance of the array.

The circuit board terminal 32 is part of a conductor run that is electrically connected to lead-in wire 24a of lamp 24 at the eyelet 24a' and terminates at radiation switches 61, 62, and 63 respectively positioned near lamps 24, 25, and 23. A circuit board conductor run 64 is connected electrically to the remaining lead wire of flash lamp 25 at eyelet 25a' and terminates at the radiation switch 61. A circuit board conductor run 65 is connected to the remaining lead-in wire of flash lamp 23 at eyelet 23a' and terminates at the radiation switch 62. Similarly, a circuit board conductor run 66 is connected to the remaining lead-in wire of flash lamp 22 at eyelet 22b' and terminates at radiation switch 63.

The radiation switches 61, 62, and 63 are respectively in contact with and bridge across the circuit runs that are connected to them. The material for the radiation switches may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches is respectively positioned behind and near to a flash lamp 24, 25, 23. Windows in the form of transparent sections or openings 69 may be provided in the reflectors in front of the switches as shown in FIG. 2 to facilitate radiation transfer. A suitable material for the radiation switches is silver oxide, silver carbonate, or a mixture of both dispersed in a binder such a polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into a socket, the circuit board terminals 31' and 32' will be connected to an activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The flash sequencing circuit on the circuit board 42 functions as follows. Assuming that none of the four lamps in the upper half of the unit 17 have been flashed, upon occurrence of a first firing pulse applied across the terminals 31, 32, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminal 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25, via the now closed radiation switch 61, whereupon the second lamp 25 flashes, thereby causing radiation switch 62 to assume zero or low resistance, and the second lamp 25 now has an open circuit or high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied, via now closed radiation switch 63, to the lead-in wires of the fourth flash lamp 22, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around the other connector tab 18' attached to the camera socket, the group of lamps that then become uppermost and relatively farthest away from the lens axis will be in an active circuit and will be flashed in the same manner as has been described. In a preferred embodiment, the lamps 22, etc., are high voltage types, requiring about 2000 volts for example, at low current, for flashing, and they can be fired by impacting or stressing a piezoelectric element in the camera, as disclosed in the above-referenced patents.

As mentioned above, FIGS. 4 and 5 show the third terminals 33 and 33' of the array in accordance with the present invention, whereas FIG. 3 shows these terminals in accordance with the prior art as disclosed in the above-referenced Blount U.S. Pat. No. 3,952,320, the circuit board 42' of FIG. 5 being substituted for the circuit board 42 of FIG. 3 in carrying out the invention. The flash array 27 is connected to a camera or adapter by plugging a connector tab 18 (or 18') into a coupler or socket 70 having first, second and third contacts 71, 72 and 73 which respectively engage against the sides of the array's terminals 31, 32, or 33 (or 31', 32', and 33'). A lamp firing pulse source 76 which may comprise a piezoelectric element 77 is connected across the socket contacts 71 and 72, and the third contact 73 is connected electrically to contact 71 for the purpose disclosed in the aforesaid Blount U.S. Pat. No. 3,952,320, i.e. by connecting the third terminal 33, via circuit run 33a, to the "hot" terminal 32' and associated circuitry of the lower group of lamps, thus electrically shorting the lower lamp group circuitry and reducing the possibility of accidental flashing of lamps in the lower group due to stray capacitance coupling of the firing pulses being conducted from terminals 31 and 32 to the upper group of lamps and their circuitry.

As mentioned above, some camera manufacturers have found it expedient, since the socket contacts 71 and 73 are electrically connected together, to make these two contacts from a single piece of metal. This may result in insufficient individual resiliency of the contacts 71 and 73 to reliably respectively contact against both of the array's terminals 31 and 33. If only the contact 71, but not 73, contacts the respective array terminal, the advantages of the referenced Blount U.S. Pat. No. 3,952,320 are not achieved. However, if only the contact 73, but not 71, contacts the respective terminal, there is a possibility that two lamps will flash simultaneously, or no lamp will flash. These undesirable results can occur as follows. Referring to FIG. 3, assume the first socket contact 71 fails to contact against the first array terminal 31, and the second and third contacts 72 and 73 properly contact against the second and third array terminals 32 and 33 whereby a firing pulse is applied across the second and third terminals 32 and 33. The path of this firing pulse can be traced, beginning from terminal 32, to the lead-in wire 24a of lamp 24, the other lead-in wire of this lamp being connected to the electrical ground area 57. A lead-in wire of lamp 28 also is connected to the electrical ground area 57, and its other lead-in wire is connected to the circuit run that is common with run 33a and thus is connected to the terminal 33. Thus the two lamps 24 and 28 are connected in electrical series across the terminals 32 and 33, and firing pulse energy applied to these terminals will pass through both lamps, likely causing both lamps to flash or possibly not causing either of the lamps to flash, depending on the firing pulse energy and the firing characteristics of the lamps. A third possibility is that only one or the other of these lamps will flash if they have widely different firing characteristics. After the first lamp (or lamps) flash, the same uncertainty exists as to how many and which lamps will be flashed by subsequent firing pulses.

The present invention overcomes the aforesaid undesirable uncertainty as to which and how many lamps will be flashed by a firing pulse when the camera socket does not properly connect to the terminals of the array, by connecting the third terminal electrically to the first terminal at each of the array's connector tabs. As shown in FIGS. 4 and 5, in the vicinity of connector tab 18 the third terminal 33 is made an integral part of the electrical ground circuit run, thus electrically connecting together the first and third terminals 31 and 33. The previous circuit run portion 33a is eliminated. Thus, of the first and third "uncertain" socket contacts 71 and 73, there is good likelihood that at least one of them will contact an array terminal 31 and/or 33, thereby preventing the above-described application of a firing pulse across two lamps in series. The terminals 31' and 33' at the other connector tab 18' are similarly arranged and connected.

The invention can be applied to flash arrays having lamps and/or sequencing circuits arranged differently than specifically disclosed herein.

While preferred embodiments of the invention have been shown and described, various other embodiments and modifications thereof will become apparent to persons skilled in the art, and will fall within the scope of the invention as defined in the following claims.

What we claim as new and desire to be secured by United States Letters Patent is:

1. A flash lamp array comprising at least one group of flash lamps and circuitry for causing sequential flashing of said lamps, and a connector carrying first, second and third connector terminals, means electrically connecting said first and second terminals to said group of flash lamps and circuitry, and conductor means electrically connecting said third terminal to said first terminal prior to and during the flashing of said lamps.

2. An array as claimed in claim 1, in which said terminals are arranged in a row across said connector, said first terminal being positioned between said second and third terminals.

3. An array as claimed in claim 1, including a housing containing said one group of flash lamps in the upper half thereof and carrying said connector at the lower end thereof, said housing further containing a second group of flash lamps and circuitry for causing sequential flashing thereof in the lower half thereof and carrying a second connector at the upper end thereof, said second connector carrying first, second, and third connector terminals, means connecting said last-named first and second terminals to said second group of flash lamps and associated circuitry, and means electrically connecting together said first and third terminals of the second connector.

4. An array as claimed in claim 3, in which the three terminals of each connector are arranged in a row across that connector, each of said first terminals being positioned between the adjacent second and third terminals.

5. An array as claimed in claim 1, in combination with a socket for receiving said connector of the array, said socket comprising first, second, and third contacts intended to respectively contact with said first, second, and third terminals of the connector, and means electrically connecting together said first and third contacts of the socket.

6. A combination as claimed in claim 5, in which said terminals are arranged in a row across said connector, said first terminal being positioned between said second and third terminals, and in which said socket contacts are arranged in a row, said first contact being positioned between said second and third contacts.

* * * * *